J. KOVACS & R. BLAHO.
RECEPTACLE FOR MILK BOTTLES.
APPLICATION FILED JULY 21, 1913.
1,125,563.
Patented Jan. 19, 1915.
2 SHEETS—SHEET 1.
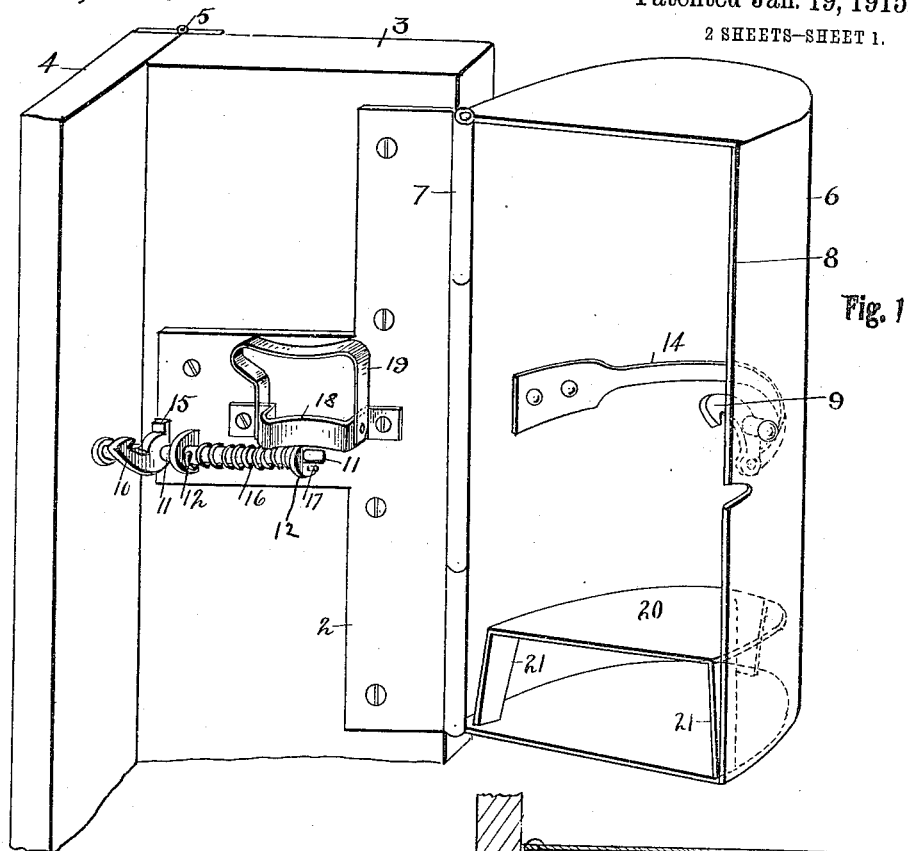
Fig. 1
Fig. 2
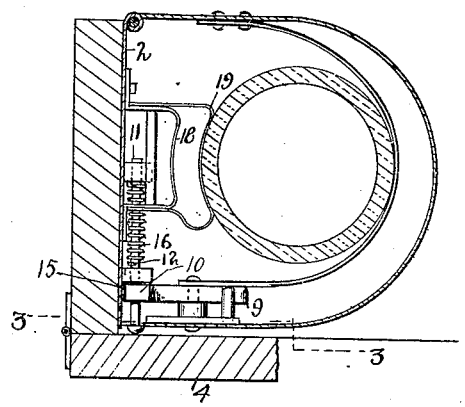
Fig. 3
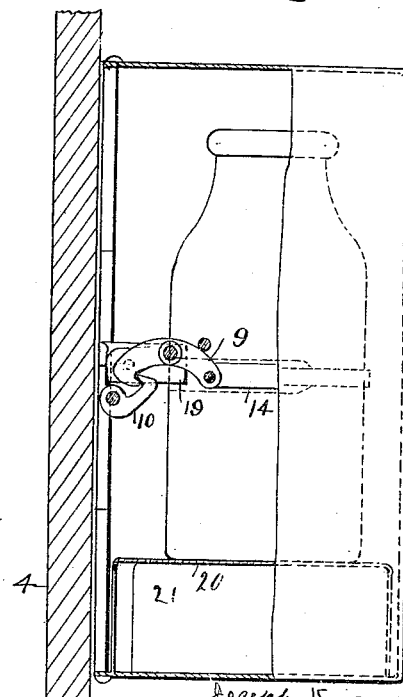
WITNESSES.
E. M. Fisher
J. C. Mussun
INVENTOR
Joseph Kovacs
Rudolf Blaho
BY Fisher & Moser
ATTORNEYS.

J. KOVACS & R. BLAHO.
RECEPTACLE FOR MILK BOTTLES.
APPLICATION FILED JULY 21, 1913.

1,125,563.

Patented Jan. 19, 1915.
2 SHEETS—SHEET 2.

WITNESSES

INVENTOR
BY Joseph Kovacs
Rudolf Blaho
ATTORNEY

UNITED STATES PATENT OFFICE.

JOSEPH KOVACS AND RUDOLF BLAHO, OF CLEVELAND, OHIO.

RECEPTACLE FOR MILK-BOTTLES.

1,125,563. Specification of Letters Patent. Patented Jan. 19, 1915.

Application filed July 21, 1913. Serial No. 780,193.

*To all whom it may concern:*

Be it known that we, JOSEPH KOVACS and RUDOLF BLAHO, citizens of the United States, residing at Cleveland, in the county of Cuyahoga and State of Ohio, have invented certain new and useful Improvements in Receptacles for Milk-Bottles, of which the following is a specification.

Our invention relates to a receptacle for milk bottles and the invention comprises a hinged receptacle having locking devices adapted to coöperate with a door and with the bottles contained within said receptacle, all substantially as herein shown and described and more particularly pointed out in the claims.

In general, the object of the invention is to provide a receptacle adapted to be secured in hinged relations to the casing of a house door and to provide locking devices for the parts so that when a milk bottle is in the receptacle the receptacle can be closed and locked to prevent removal of the bottle except when the door is opened.

A further object is to have locking devices which will absolutely prevent the locking of the receptacle when no bottle is in place therein.

A further object is to provide devices adapted to co-act with said locking means so as to permit locking effects to be obtained by bottles of different sizes.

Figure 4:
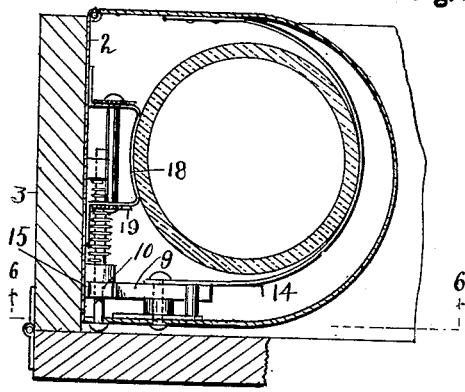
Figure 5:
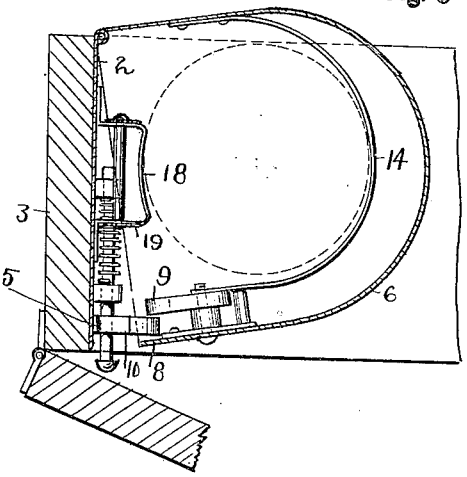
Figure 6:
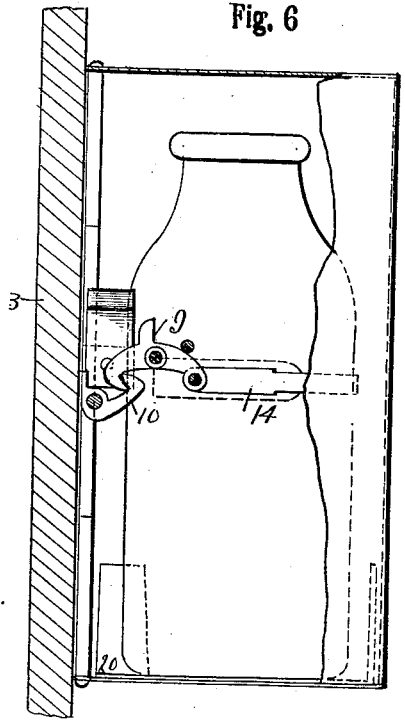
Figure 7:
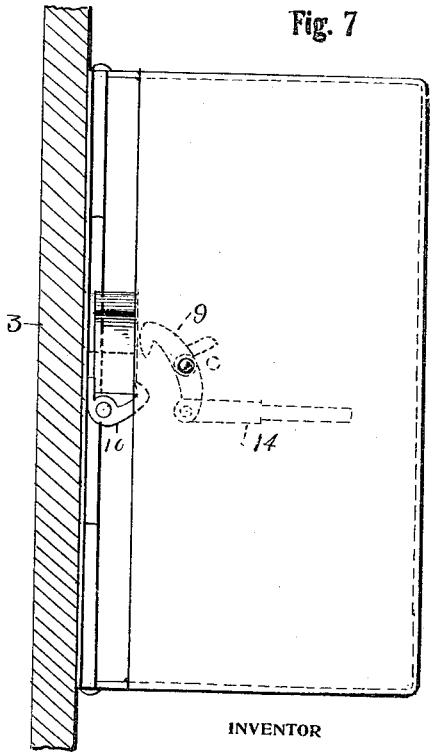

In the accompanying drawings, Figure 1 is a perspective view of our invention secured upon a door casing and showing a portion of a house door, the receptacle being thrown wide open. Fig. 2 is a cross section of the receptacle, casing and house door showing a locked relation of the parts with a milk bottle of relatively small diameter. Fig. 3 is a side view partly in section, being taken on line 3—3, of Fig. 2. Fig. 4 is a cross section similar to Fig. 2, excepting that a milk bottle of larger diameter is shown as seated therein. Fig. 5 is a similar view to Fig. 4, but showing the receptacle unlocked and partly open. Fig. 6 is a side elevation and section taken on line 6—6, of Fig. 4 and showing the locked relation of the parts. Fig. 7 is a side view taken from the same point of view as Fig. 6, but showing the unlocked relation of the parts as they appear in Fig. 5.

The device comprises a plate 2 which is adapted to be screwed to the inner face of the base 3 for a house door 4, said door being hinged at 5 to the casing. The receptacle proper comprises a stamped metal housing 6 of semi-circular form in cross section having its rear portion entirely open. A hinged connection is provided at one side edge of the receptacle with the plate 2 adapting the receptacle to swing out of the base 3 into a position substantially as shown in Fig. 1. When the receptacle is swung inward the rear portion is closed by base 3 and the free edge 8 is relatively near the face of house door 4, see Fig. 2.

The locking part of the device comes together in the angle or corner formed by the door and base, one of the locking parts comprising a hook lever 9 rotatably mounted on the receptacle wall near its edge 8 and the other locking member comprising a catch 10 rigidly affixed to a slidable and rotatable bolt 11 which is carried by projections 12 on plate 2. Hook 9 has its operating end pivotally connected to one end of a spring bow 14, the other end of said bow being riveted to the opposite wall of the receptacle. Normal tension of the spring bow is to maintain the hook 9 in an upright position so that no locking engagement can be made with the catch 10 when the receptacle occupies or is swung within the base of the door. Catch 10 is held in a fixed rest position by its stop shoulder 15 thereon and by the tortional effect of a coil spring 16 which has one end connected to bolt 11 and the other end 17 engaged with one of the projections 12, see Fig. 1. Spring 16 is also capable of pressing bolt 11 outward, whereby catch 10 is accordingly shifted in respect to hook 9 when door 4 is swung open. That is to say when door 4 is closed bolt 11 is forced inward and the catch 10 then occupies a position directly in line with hook 9, but when the door 4 is open the hook 9 will be released by the outward movement of catch 10, assuming, however, that a bottle is in place within the receptacle. Thus, when a bottle is seated within the receptacle it will engage spring bow 14, and when the receptacle is closed the bottle will come in contact with either one of the two brackets 18 or 19 respectively on plate 2. Bracket 18 is riveted to the plate, whereas bracket 19 is pivotally mounted upon bracket 18, so that it may be elevated or lowered at will. When bracket 19 is raised a milk bottle of large diameter can be accommodated within the receptacle, the sides of the bottle engaging the curved face of bracket 18 and the bow spring 14, see Fig. 4. If a small bottle is to be accommodated bracket 19 is lowered into the position shown in Fig. 2. It is also desirable to bring the smaller bottle to a higher elevation in the receptacle in view of a shorter length with bottles of larger diameter, and therefore we provide a stand 20 having legs 21 which is adapted to occupy the bottom of the receptacle in the position as shown in Fig. 1 or in an inverted position as shown in Fig. 6.

In operation, and assuming that a quart bottle is to be confined within the receptacle, stand 20 is placed in the bottom thereof with its legs extending upwardly. Bracket 19 is also raised. This alone will indicate to the delivery man what is wanted, and when door 4 is closed bolt 11 is pressed inward to set the catch 10 opposite the hook 9, but there being no bottle in the receptacle hook 9 cannot be in locking engagement with catch 10. Therefore, the receptacle is free to be swung outward to receive the bottle. When the bottle is inserted the receptacle can be locked by merely swinging the receptacle inward until the bottle engages bracket 18, a further pressure causing the bow spring 14 to tilt hook 9 into locking relations with catch 10, the coil spring 16 also co-acting in this locking of the parts by permitting catch 10 to slidably rotate as the bowed ends of the hook and catch come together. The parts are now locked and the receptacle cannot be opened until the door 4 is swung inward, whereupon bolt 11 is forced outward by its spring 16 and the catch 10 shifted in respect to hook 9 and release between the two parts is effected. Locking and unlocking operations as described are exactly the same whether a small or a large bottle is used, but with the small bottle it is necessary to lower bracket 19, and, although it is not absolutely necessary, we also prefer to use stand 20 to support said bottle at a higher elevation.

What we claim is:

1. A receptacle for milk bottles comprising a hinged bottle housing having a spring bow within the same at about its middle adapted to be engaged by a bottle and a hook pivoted on said housing pivotally connected with the otherwise free end of said bow, and a separately mounted catch adapted to be inclosed by said housing and to be engaged by said hook when the housing is closed, in combination with a bracket member supported opposite said bow and adapted to bear against a bottle supported in said housing and press the bottle against said bow.

2. A hinge supported housing for milk bottles having a bowed spring and a pivoted hook engaged therewith and both said parts affixed to said housing, in combination with a fixed base having a spring pressed catch adapted to be engaged by said hook and a pivoted bracket mounted on said base and adapted to bear against a bottle in said housing, the said bowed spring being substantially opposite said bracket and in actuating relations with said hook, whereby when a bottle is placed in the housing and the housing is closed the said hook will automatically engage said catch.

3. A receptacle for milk bottles comprising a base and a bottle housing hinged to close thereon, a hook pivoted in said housing and a spring bow in actuating relation therewith, in combination with a slidable and rotatable bolt on said base and a catch on said bolt adapted to be engaged by said hook, and a bracket in said base opposite said spring and adapted to press a bottle back against the spring and thus actuate said hook.

4. A fixed base and a door hinged to one edge thereof, a bottle housing hinged on the other edge of said base and a bowed spring fixed therein and a hook on said housing engaged by said spring, in combination with a spring pressed slidable and rotatable bolt mounted on said base and a catch on said bolt adapted to be engaged by said hook, and a pivotally supported bracket on said base substantially opposite said bowed spring and adapted to press a bottle against the said spring.

5. A receptacle for milk bottles comprising a base and a housing for the bottle hinged to swing to closing position thereon and having a spring bow to bear against the body of the bottle and a plurality of brackets on said base adapted to bear against the body of the bottle opposite the said bow, one of said brackets being pivoted to swing out of engaging position, and means to automatically lock said housing upon said base comprising a hook operatively engaged with said spring bow and a catch on said base for said hook.

In testimony whereof we affix our signatures in presence of two witnesses.

JOSEPH KOVACS.
RUDOLF BLAHO.

Witnesses:
F. C. MUSSUN,
E. M. FISHER.

Copies of this patent may be obtained for five cents each, by addressing the "Commissioner of Patents, Washington, D. C."